US006108902A

United States Patent [19]

Burgholzer

[11] Patent Number: 6,108,902

[45] Date of Patent: Aug. 29, 2000

[54] CONTACT PIN HEADER CONNECTOR REPAIR METHOD AND REPAIR FIXTURE

[75] Inventor: Bruce L. Burgholzer, Montgomery, Ill.

[73] Assignee: Lucent Technologies, Inc., Murray Hill, N.J.

[21] Appl. No.: 09/009,523

[22] Filed: Jan. 20, 1998

[51] Int. Cl.[7] .......... B23P 6/00

[52] U.S. Cl. .......... 29/845; 29/402.02; 29/402.06; 29/402.08; 29/747

[58] Field of Search .......... 29/402.01, 402.02, 29/402.03, 402.06, 402.08, 747, 845

[56] References Cited

U.S. PATENT DOCUMENTS

| | | | |
|---|---|---|---|
| 4,655,517 | 4/1987 | Bryce | 339/17 LC |
| 5,017,145 | 5/1991 | Kanai et al. | 439/45 |
| 5,050,296 | 9/1991 | Emerick et al. | 29/845 |
| 5,208,968 | 5/1993 | Camsell et al. | 29/739 |
| 5,373,626 | 12/1994 | Youngfleish | 29/739 |
| 5,386,626 | 2/1995 | Cheng | 29/843 |
| 5,644,839 | 7/1997 | Stone | 29/842 |
| 5,715,595 | 2/1998 | Kman et al. | 29/854 |
| 5,850,693 | 12/1998 | Guran et al. | 29/884 |

OTHER PUBLICATIONS

Berg™ Electronics; Metral ™ Shelf Level Backplane Repair Kit; MT370–01 Manual; Berg PN#412970; Issue 1 Dated May 22, 1992.

*Primary Examiner*—Lee Young
*Assistant Examiner*—Kevin G. Vereene
*Attorney, Agent, or Firm*—Wildman, Harrold, Allen & Dixon; Carmen B. Patti

[57] ABSTRACT

An annular insulator is positioned around a compliant contact section of a replacement contact pin for a header contact pin connector prior to insertion of the replacement contact pin through a header pin mounting hole and then both the replacement pin and the annular insulator being carried by the replacement pin are simultaneously pounded into snug received relationship within an associated pin receptor connector hole. A header contact pin repairing fixture has a plurality of size reducing holes for reducing the cross sectional dimension of the compliant section, one of which has an insulator end receiving opening for nesting receipt of a tapered wall at the end of the insulator to hold it in an upright orientation above and in alignment with the smallest sizing hole during insertion of the replacement pin into the insulator bore.

14 Claims, 8 Drawing Sheets

CONTACT PIN HEADER CONNECTOR REPAIR METHOD AND REPAIR FIXTURE

BACKGROUND OF THE INVENTION

1. Field of the Invention

This invention relates to a method of repairing a contact pin header connector employed to connect a plurality of elongate contact pins carried thereby with associated pin receptor connectors of a contact interlayered backplane and an apparatus for facilitating such repair.

2. Description of the Related Art

Referring to FIGS. 1 and 2, a prior art header connector assembly 10 is seen carrying a plurality of elongate header contact pins 12 that are received within and extend through associated interlayered pin receptor connectors 14. The pin receptor connectors 14 are mounted within pin receptor holes 13 extending through a backplane 15 of a multiport telephonic switch or the like. The header connector assembly 10 includes a rectangular, insulating header body 16 with a contact wall 18 extending between a pair of opposed, spaced, generally rectangular legs 20 extending perpendicularly from opposite ends of the contact wall 18. The contact wall 18 has a plurality of pin mounting holes 22 within which an enlarged diameter section or shoulder 12A of the contact pin 12 is snugly received and frictionally held. The enlarged diameter section 12A of the pin 12 is located between an aft pin section 12B protectively positioned between the legs 20 and a forward, leading end section 12C which protrudes from a back side 15A of the backplane 15. Between the enlarged diameter section 12A and the leading end section 12C is a compliant contact section 12D.

The compliant section is located within the backplane 15 and makes electrical contact with conductive layers 24 imbedded within the backplane 15 at inner layer connectors 25 within the pin receptor connector 14. As seen in FIG. 3A, the compliant contact section 12D has an H-shaped cross section with two pairs of spaced arms 26 and 28 in opposed relationship with respect to one another. The arms 26 and 28 resiliently press against the inner sides of the pin receptor holes 13 and the interlayered connector 25 to endure good electrical contact.

In addition, when it becomes necessary to repair the header connector assembly 10 the H-shaped cross section of the compliant contact section 12D enables it to be distorted into a reduced cross sectional dimensional shape, as shown in FIG. 3B. With this reduced dimensional shape shown in FIG. 3B, the compliant contact section 12D is enabled to be inserted into an annular insulator 30 shown in FIG. 4.

The annular insulator 30 has an elongate cylindrical body 32 and an annular shoulder 34 mounted to and radially extending outwardly from one end of the elongate body 32. Adjacent the opposite end of the cylindrical body is a tapered, preferably truncated conical, wall 36 that slants inwardly in a direction extending toward the end 37 opposite from the end with the annular shoulder 34. Extending through the shoulder 34, the elongate cylindrical body 32 and the tapered wall 36 is an elongate, centrally located cylindrical bore 38. The bore 38 is sized to snugly receive the compliant section 12D after it has been distorted into the reduced dimensional shape shown in FIG. 3B.

In accordance with the known method of repair of the header assembly 10, a selected one of the contact pins 12 is first removed from both the pin receptor hole 13 in the backplane 15 and from the associated pin mounting hole 22 in the contact wall 18 of the header body 16. This is accomplished by firmly grasping the object, or target, contact pin 12 with a so-called signal pin extraction tool (not shown) and then hammering the extraction tool in a direction away from the header contact wall 18 with a slide hammer attached to a handle end of the pin extraction tool until the object pin 12 has been fully removed from both the backplane 15 and the header body 16. This is done while the header assembly 10 remains mounted to the backplane 15 with the remaining contact pins 12 still interconnected with the backplane 15 and the contact wall 18.

After the object contact pin 12 has been extracted, in accordance with the known method of repair, the pin mounting hole 22 is enlarged to first enable passage of a drill bit into drilling engagement with the associated pin receptor connector hole 13. Using the relatively reduced diameter drill bit, the associated pin receptor connector hole 13 is enlarged to a diameter slightly larger than the outer diameter of the cylindrical body 32 to enable receipt of the cylindrical body 32 within the enlarged pin receptor connector hole 13. However, the enlarged pin receptor connector hole 13 is smaller than the outer diameter of the annular shoulder 34 to block the annular shoulder 34 and thus the entire annular insulator 30 from passing entirely through the pin receptor hole 13. Then the empty pin mounting hole 22 from which the object contact pin 12 has been extracted is also enlarged with a drill to a diameter which is slightly larger than the outer diameter of the of the annular shoulder 34 of the annular insulator 30 to accommodate passage of the entire insulator 30 including the shoulder 34 through the enlarged pin mounting hole 22.

A replacement pin 12' is fabricated by distorting the compliant contact section 12D to reduce the cross dimensional dimensions of the compliant section 12D of a replacement pin 12', FIG. 5, from that shown in FIG. 3A to that shown in FIG. 3B. Preferably a new contact pin, other than the extracted contact pin 12 is fabricated to produce the replacement pin 12'. Alternatively, the object contact pin 12 that was extracted is fabricated to produce the replacement contact pin 12'. In any event, in accordance with the known method, the contact pin selected for fabrication into a reduced cross dimensional replacement pin 12' has its compliant contact section 12D reduced by forcing the selected contact pin 12 successively into a regressively, size-ordered series of four different sized holes in a No. 13 drill gauge, starting with the largest drill gauge hole and ending with the smallest sized drill gauge hole until the compliant contact section 12D has been progressively reduced with respect to its cross sectional dimension to that shown in FIG. 3B. This reduction in cross sectional dimension enables insertion of the reduced cross sectional compliant contact section 12D into the elongate bore 38 of the insulator 30, as shown in FIG. 5.

In accordance with the known repair method, the insulator is inserted through the empty, enlarged, header pin mounting hole 22, and the cylindrical body 32 is inserted fully into the empty, enlarged pin receptor hole 13 with the shoulder 34 in abutting relationship with the surface of the backplane 15 at the bottom of and within the enlarged pin mounting hole 22. The cross dimensionally reduced replacement pin 12' is then releasably grasped at the end of the elongate signal pin insertion tip tool. The pin insertion tip tool is then manually manipulated to maneuver the leading end section 12C through the empty enlarged pin mounting hole 22 and into the opening of the cylindrical bore 38 adjacent the shoulder 34 while seated in the bottom of the pin mounting hole 22 in abutting relationship with the backplane 15. A slide hammer is attached at an end opposite the end grasping the replacement pin and used to hammer the replacement pin 12' through the elongate bore 38 of the insulator 30 while held within the enlarged receptor pin hole 13 until the enlarged diameter section 12A is in abutting relationship with the shoulder 34, as shown in FIG. 5.

The desired end result of this process is the location of the replacement pin 12' in the bore 32 of the insulator 30 seated within the enlarged pin receptor hole 22 with the enlarged diameter section 12A in abutting relationship with the collar 34 and contained within the enlarged pin mounting hole 22 of the header connector contact wall 18, as shown in FIG. 5.

The difficulty with this process that has been observed in practice is that because of the relative fragility of the insulator 30, the requisite tight dimensional tolerances and the difficulty of maintaining proper co-alignment of the replacement pin 12' with the bore 38, the insulator 30 often are damaged in the process of inserting the replacement pin 12' fully into the bore 38. For example, the cylindrical body 32 of the insulator 30 breaks away from the shoulder 34 when the replacement pin 12' is inserted into the insulator 30.

SUMMARY OF THE INVENTION

In accordance with the present invention a new method of repairing a contact pin header to connector which alleviates the insulator breakage problem and facilitates insertion of the replacement pin into the annular insulator with a new sizing fixture which performs the dual function of properly sizing the compliant section and holding the insulator during replacement pin insertion into the annular insulator to reduce insulator pin breakage.

Preferably, the method of the present invention for repairing a contact pin header connector having a contact wall with a plurality of pin mounting holes for carrying a plurality of contact pins extending through the wall and connected at a compliant contact section with an associated plurality of interlayered pin receptor connectors of a backplane to which the header connector is mounted comprises the steps of removing a contact pin from a selected one of the plurality of pin mounting holes in the contact wall of the header connector, positioning an annular insulator around a replacement pin with a compliant contact section at a preselected location between opposed ends of the replacement pin, enlarging the selected pin mounting hole sufficiently to enable the replacement pin and the annular insulator carried by the replacement pin to pass through the selected pin mounting hole, after enlarging the selected pin mounting hole, inserting a leading edge portion of the replacement pin through the selected pin mounting hole and the associated backplane interlayered pin receptor connector until the annular insulator is received within the associated backplane interlayered pin receptor connector and with the annular insulator being held within the associated backplane interlayered pin receptor, pushing the replacement pin through the annular insulator until the compliant contact section is protectively surrounded by the annular insulator within the associated backplane interlayered pin receptor connector.

The present invention also contemplates repairing a contact pin header connector having a contact wall with a plurality of pin mounting holes for carrying a plurality of contact pins extending through the wall and connected with an associated plurality of interlayered pin receptor connectors of a backplane to which the header connector is mounted, by performance of the steps of removing a contact pin from a selected one of the plurality of pin mounting holes in the contact wall of the header connector, fabricating a replacement pin by reducing the diameter of a compliant contact portion of the replacement pin to enable receipt of both the compliant contact portion and an annular insulator surrounding the compliant contact portion within the associated backplane interlayered pin receptor connector by passing the compliant contact portion through a sizing hole in a pin sizing fixture having inner section with a diameter less than that of the compliant contact portion of the replacement pin, and an outer, relatively enlarged section extending between and joining a relatively enlarged pin receiving opening having a diameter larger than an outer diameter of the annular insulator and the diameter of the relatively reduced inner section, positioning the annular insulator around the replacement pin at a preselected location between the opposed ends of the replacement pin by the steps of supporting an end of the insulator in the outer, relatively enlarged section in an upright orientation with its central axis of the inner section of the sizing hole, and pushing the replacement pin through the annular insulator and into the inner section of the sizing hole while the insulator is being supported in the outer relatively enlarged section with the compliant section within the insulator, and inserting the replacement pin and insulator through the preselected pin mounting hole and through the associated backplane pin receptor connector with the compliant section protectively surrounded by the annular insulator located in the associated backplane pin receptor connector.

A preferred embodiment of the header contact pin repairing fixture of the present invention is preferably employed in practicing the method of the invention includes a rigid member with a plurality of size reducing holes of different size for successively reducing the cross sectional dimension of a compliant contact section of a replacement header contact pin by successively forcing the compliant contact section through the plurality of sizing holes of successively smaller size until the compliant contact section has been sufficiently reduced in cross sectional dimension to enable receipt of the compliant contact section within an elongate bore of an annular insulator, and providing for supporting the annular insulator in an upright orientation and against lateral misaligning movement to facilitate forced insertion of the compliant contact section into protective insulating receipt within the bore of the annular insulator after being sufficiently reduced to enable receipt within the bore.

BRIEF DESCRIPTION OF THE DRAWINGS

The foregoing advantageous features of the contact pin header repairing method and fixture will be made apparent from the detailed description of the preferred embodiment given with reference to the several views of the drawing, in which.

DESCRIPTION OF THE PREFERRED EMBODIMENT

Figure 1:
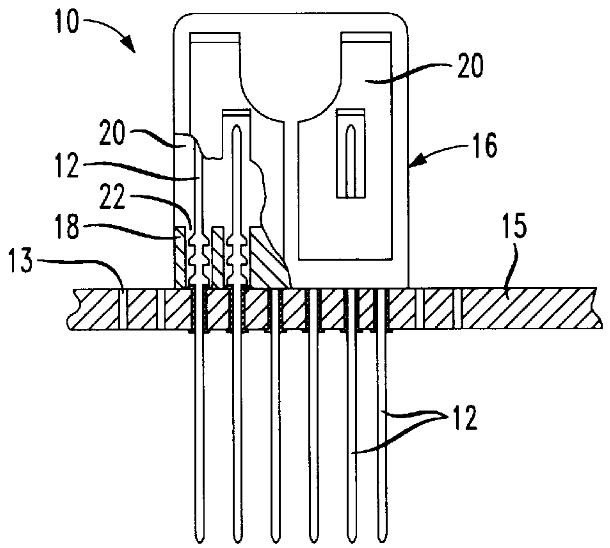
FIG. 1 PRIOR ART
FIG. 1 is a side elevational view, partly in section, of a prior art contact pin header connector mounted to a backplane.
Figure 2:
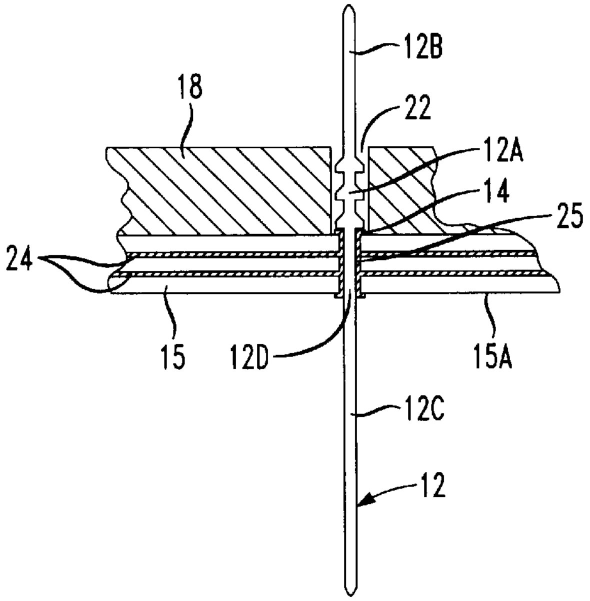
FIG. 2 PRIOR ART
FIG. 2 is an enlarged, cross sectional, side elevational view of one of the contact pins of the header connector of FIG. 1.
Figure 3A:
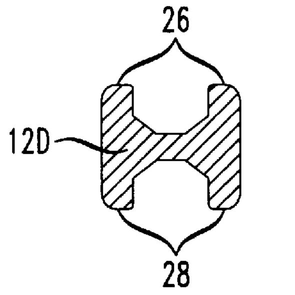
FIG. 3A PRIOR ART
FIG. 3A is an enlarged cross sectional view taken through the compliant section of the prior art contact pin of FIG. 2.
Figure 3B:
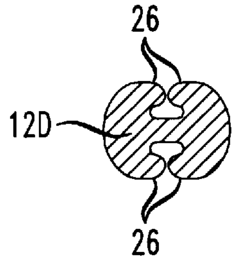
FIG. 3B PRIOR ART
FIG. 3B is a cross sectional view taken through the compliant section of a prior art replacement pin after it has been distorted to reduce its cross sectional dimension.
Figure 4:
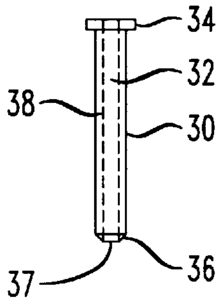
FIG. 4 PRIOR ART
FIG. 4 is a side elevational view of a prior art annular insulator.
Figure 5:
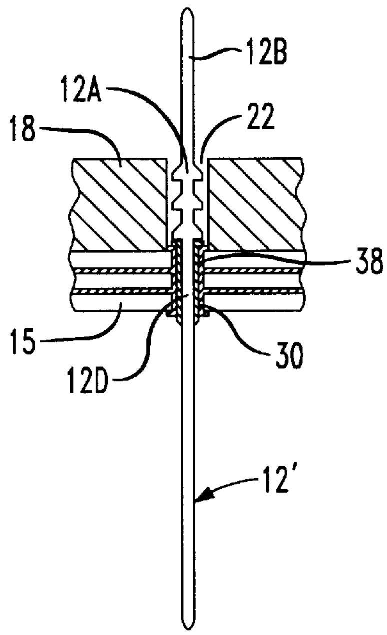
FIG. 5 PRIOR ART
FIG. 5 is a cross sectional side view of a prior art replacement contact pin with its dimensionally reduced compliant section protectively contained within the insulator of FIG. 4 which, in turn, is received within the enlarged pin receptor hole in the backplane.
Figure 6A:
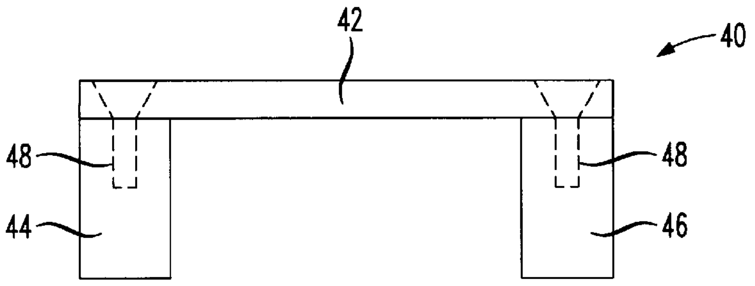
FIG. 6A is a side elevational view of the preferred embodiment of the pin sizing fixture of the present invention.
Figure 6B:
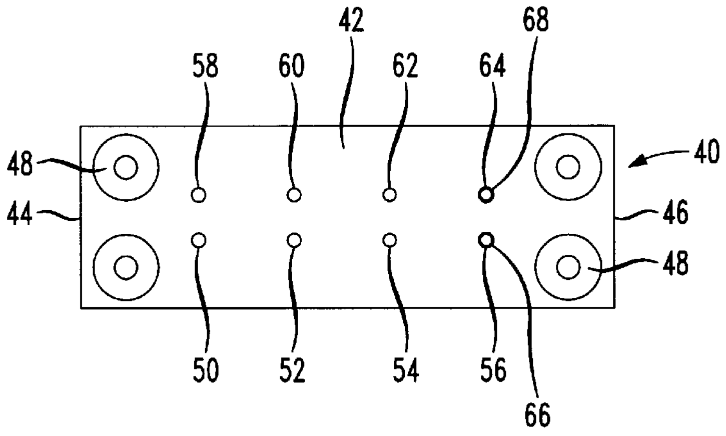
FIG. 6B is a plan view of the pin sizing fixture of FIG. 6A.
Figure 6C:
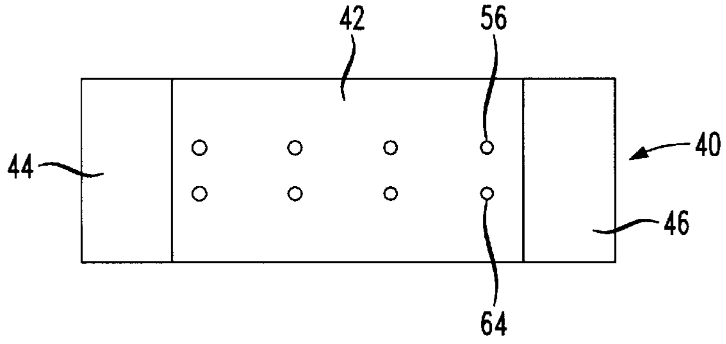
FIG. 6C is a bottom view of the pin sizing fixture of FIG. 6A.

Referring now to FIGS. 6A, 6B, 6C and 6D the preferred embodiment of the header contact pin repairing fixture 40 include a rigid, preferably steel, rectangular top member 42 supported at opposite ends by a pair of substantially square legs 44 and 46 secured to the top member 42 by means of counter-sunk, screw fasteners 48. As best seen in FIG. 6B, the top member 42 has a plurality of size reducing holes 50, 52, 54 and 56 in one straight line series across the length on one side and another series of size reducing holes 58, 60, 62 and 64 on the other side. The two series are arranged in a descending order based on their different size. The largest holes 50 and 58 have diameters on the order of 0.031 inch while the smallest sizing holes 56 and 64 having diameters on the order of 0.026 inch. The cross sectional dimension of the compliant contact section 12D of the replacement pin 12' is reduced by successively forcing the compliant contact section through the plurality of size reducing, or sizing, holes 50–56 and 58–64 of successively smaller size until the compliant contact section 12D has been sufficiently reduced in cross sectional dimension to enable receipt of the compliant contact section 12D within the elongate bore 38 of the annular insulator 30.

Figure 6D:
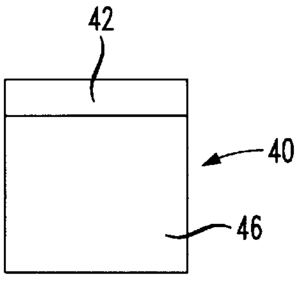
FIG. 6D is an end elevational view of the pin sizing fixture of FIG. 6A.

Referring specifically to FIG. 6D, the top 42 carries means, preferably in the form of insulator end receiving tapered holes 66 and 68 for supporting the annular insulator 30 in an upright orientation and against lateral misaligning movement to facilitate forced insertion of the compliant contact section 12D into protective insulating receipt within the bore 38 of the annular insulator 30 after being sufficiently reduced to enable receipt within the bore 38.

Figure 7A:
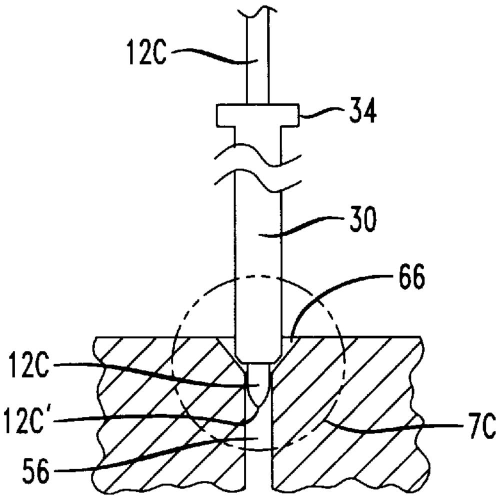
FIG. 7A is a cross sectional side view of a portion of the sizing fixture of FIGS. 6A and 6B being used in accordance with one of the steps of the preferred method of the invention to support the annular insulator during insertion of the replacement pin into the bore of the annular insulator.
Figure 7B:
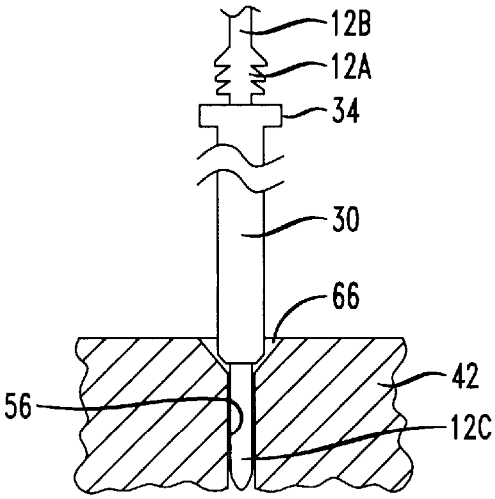
FIG. 7B is a cross sectional view of the portion of the sizing fixture of FIG. 7A being used in a subsequent step of the preferred method to fully insert the replacement pin into the annular insulator with the reduced dimensional compliant section protectively received within and surrounded by the annular insulator.
Figure 7C:
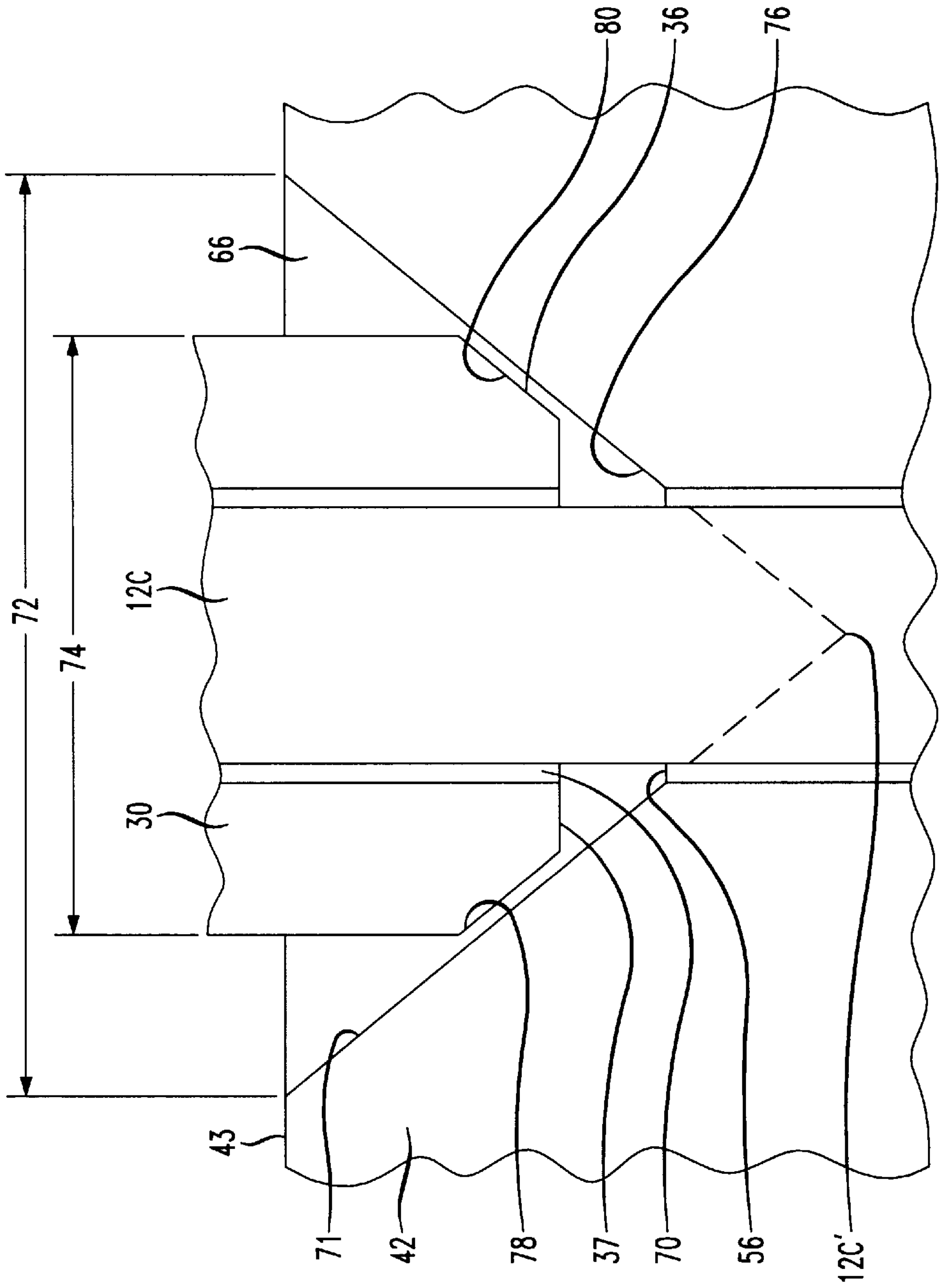
FIG. 7C is an enlarged cross sectional view of FIG. 7A at circle 7C whereby the insulator end receiving opening provides means for nesting receipt of the leading end of the elongate insulator above and in alignment with the replacement pin contact pin receiving opening.

Referring now also to FIGS. 7A, 7B and 7C, the annular insulator support holes 66 and 68 are substantially identical, and, accordingly, the description of only the insulator support hole 66 described with reference to these drawing figures should be understood to apply also the insulator support hole 68. The insulator support hole 66 is aligned with an elongate replacement contact pin receiving opening in the rigid member 42 which preferably coincides with the smallest sizing hole 56. The smallest sizing hole 56 thereby advantageously serves a dual function. Alternatively, a separate pin receiving opening is provided beneath the insulator support surface. As illustrated in FIGS. 7A and 7B, the insulator is supported by the insulator support hole in order to press the compliant contact section 12D into snug, protective receipt within the bore 38 of the insulator 30, and in so doing, the leading end section 12C is forced out of the open end 70 of the bore 38 at the leading end 36 of the insulator 30.

As best seen in FIG. 7C, the insulator end receiving opening 66 provides means for nesting receipt of the leading end 36 of the elongate insulator 30 above and in alignment with the replacement contact pin receiving opening 56. The insulator end receiving opening 66 has a tapered, preferably truncated conical, wall 71 formed in the rigid member 42 and aligned above the contact receiving opening 56. The contact receiving opening 56 has a cross sectional dimension 72 adjacent the top surface 43 of the rigid member 42 that is greater than the outer diameter 74 of the leading end section 12C of the elongate replacement pin 12' to enable receipt of the leading end section 12C within the insulator end receiving opening 66. The conical wall 71 defines an insulator abutment surface 76 extending from an inner location 78 beneath the top surface 43 to the location at which the wall 71 merges with the replacement pin receiving opening 56 which is recessed in the top surface beneath the abutment surface. The abutment surface 76 has a cross sectional dimension that is less than the outer diameter 74 of the leading end section 12C of the elongate insulator 30 to support the leading end section 12C of the elongate insulator 30 above the replacement contact pin receiving opening 56 during forced insertion of the leading end 12C through the bore 38 of the annular insulator 30.

Preferably, the inwardly tapered wall 71 of the insulator end receiving opening 66 has a frusto-conical shape which conforms to a frusto-conical, tapered shape of the leading end of the tapered wall section 36 of the elongate insulator 30 to provide substantially continuous seating engagement with the leading end of the tapered wall section 36 of the insulator 30. advantageously, the inwardly tapered wall section 71 of the insulator end receiving opening 66 supports the tapered wall 36 section at a location intermediate and spaced from both the top surface 43 of the rigid member 42 and the recessed pin receiving opening 56. This facilitates easy receipt of the insulator end section 36 and end 37 by guiding them into the replacement pin receiving opening 56. In addition, the conforming frusto-conical shapes of the insulator end section 36 and the wall 71 of the insulator end receiving opening 66 co-act to assist in proper vertical alignment of the insulator 30 and the leading end of the replacement pin 12' and to then restrain them against relative lateral misaligning movement.

Referring to FIGS. 7A and 7B, the preferred method for repairing the contact pin header connector 16 begins first with the step of removing a contact pin, or object pin, 12 from a selected one of the plurality of pin mounting holes 22 in the contact wall 18 of the header connector 16. Next, a replacement pin 12', either the original pin just extracted, if not bent and of the appropriate length to extend beyond the backplane for point to point wire contact required in the repair process or, if not, a previously unused replacement pin 12' is fabricated. Preferably, this fabrication is performed in accordance with the method described above by reducing the diameter of the compliant contact section of the replacement pin 12'. This reduction enables receipt of both the compliant contact portion 12D within the bore 38 of the annular insulator 30 surrounding the compliant contact section 12D and the annular insulator 30 within the associated backplane interlayered pin receptor connector hole 13. The compliant contact section 12D is through the pin receiving and sizing hole 56 after passing through and being guided by wall 71 of the insulator end receiving opening 66 in the pin sizing fixture 40.

The annular insulator 30 is then positioned around the replacement pin 12' at a preselected location, as shown in FIG. 7B, with the annular collar 34 in abutting relationship with the enlarged diameter section 12A between the opposed ends, or end sections, 12C and 12B of the replacement pin 12'. Preferably, this is performed by the repairer first inserting the leading end section tip 12C' into opening of the bore 38 adjacent the collar 34 and pressing a portion of the replacement pin lead end section 12C partly into the bore 38 preferably using holding the insulator with the hand and which is only approximately 0.25 inch in length and has an outer diameter of only approximately 0.034 inch. The replacement pin 12' being much longer than the annular insulator 30, having a length of approximately 0.1 inch, is preferably held with a needle nose pliers which is used to insert the replacement pin 12' into the insulator 30. The insulator 30 is held by hand in an upright orientation with the frusto-conical surface of tapered wall 36 in nestled supportive engagement with the mating surface 71 at location 78, as shown in FIG. 7C, while the leading end section 12C is pressed through the bore 38 until the end section tip 12C' and a length of the leading end section 12C slightly protrudes from the end 36 by approximately 0.030 inch, as shown in FIG. 7A and also shown in broken line in FIG. 7C.

Use of the repairing fixture 40 at this stage of the replacement pin insertion process is preferred but not necessary to avoid significant pin and insulator breakage and the pin is capable of being partially inserted to the extent shown in FIG. 7A with the use of only pliers. However, thereafter the clearance between the replacement pin 12' and the bore 38 is slight to create a very tight fit and for the remainder of the pin insertion process the end 36 of the insulator 30 is supported in the outer, relatively enlarged section or opening 66 in an upright orientation with its central axis aligned with that of the inner section of the pin receiving opening of the sizing hole 56 while pushing the replacement pin 12' through the annular insulator 30 and into the inner section of the sizing hole 56 while the insulator 30 is being supported in the outer relatively enlarged section 66. This is preferably performed with a slide hammer with a pin insertion tip which is used to pound the replacement pin 12' through the bore 38 until the enlarged diameter section 12A abuts against the shoulder 34 to block further relative movement between the replacement pin 12' and the insulator 30.

Advantageously, during this pounding of the replacement pin 12 fully into the bore the mating relationship between the frusto-conical surfaces 71 and 80 provides restraint against relative lateral movement between the insulator 30 and the pin receiving opening 56 while also tending to self align the insulator 30 with the bore 38 centered directly above and coaligned with the elongate axis of the pin receiving opening 56. It should be appreciated that the inwardly slanted wall 71 will provide the end 36 with nestled support even in the absence of the frusto-conical surface 80 carried at the end 36 of the insulator 30. Also, advantageously the elongate passageway of the pin sizing opening 56 also provides snug support of a the portion of the leading end section 12C to restrain it against lateral relative movement and bending during the slide hammering with a pin insertion tip tool 78 of the replacement pin 12' while also maintaining the replacement pin 12' in proper centered alignment with the enlarged diameter opening 66.

Figure 8A:
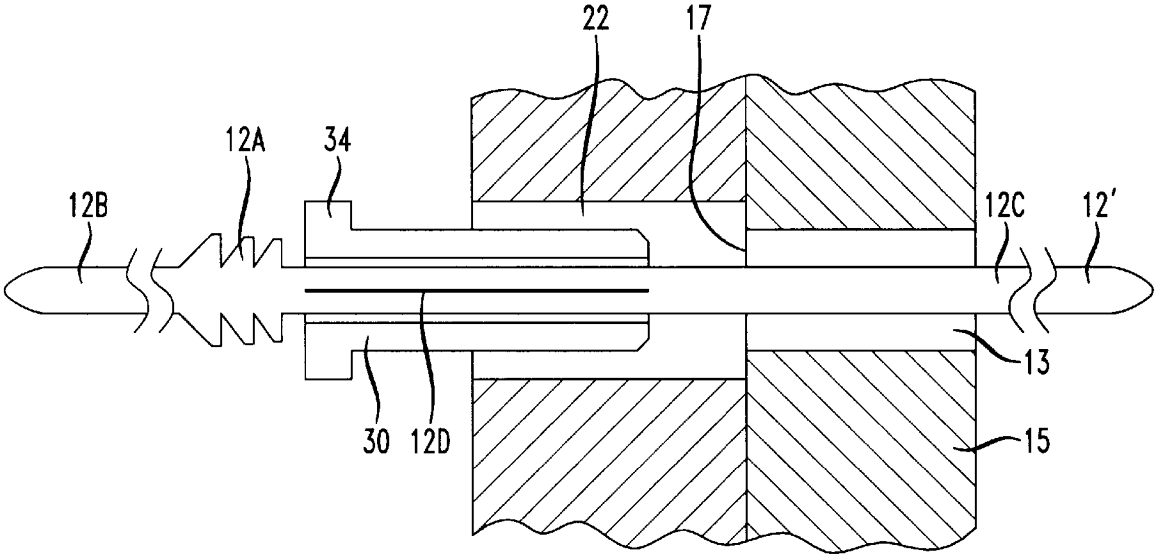
FIG. 8A is an enlarged cross sectional view of the replacement pin with the annular insulator carried thereby while being inserted through the enlarged header pin mounting hole and the enlarged, backplane pin receptor hole in accordance with the preferred method of practicing the invention.
Figure 8B:
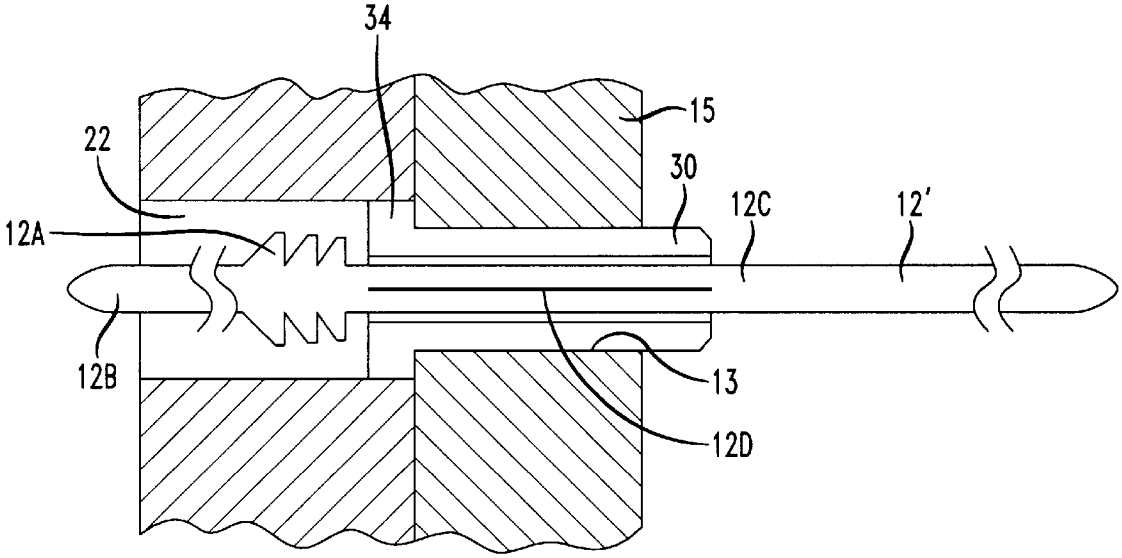
FIG. 8B is a cross sectional view of the replacement pin with the annular insulator fully inserted through the enlarged header pin mounting hole and the enlarged, backplane pin receptor hole with the annular insulator contained within the enlarged pin receptor hole at the conclusion of the preferred repair method of the present invention.

Referring now also to FIGS. 8A and 8B, the replacement pin end section 12B is used to manipulate the replacement pin 12' and the fully inserted insulator 30 being carried by the leading end section 12C to insert the leading end section 12C and the insulator 30 through the preselected pin mounting hole 22, as seen in FIG. 8A. The insertion of the insulator 30 with the replacement pin 12' is then continued through the associated backplane pin receptor connector opening 13 of the associated pin receptor 14 with the compliant contact section 12D protectively surrounded by the annular insulator 30 located in the associated backplane pin receptor connector 14, as shown in FIG. 8B.

Preferably, the insulator 30 is pushed into the receptor hole 13 by using a slide hammer grasping the end section 12B opposite the leading end section 12C to pound the replacement pin 12' toward the backplane 15 after the leading end section has been positioned in the receptor opening 13 and the leading end 36 of the insulator 30 has been positioned at the mouth 17 of the receptor hole 13. Advantageously, the elongate directed force of the slide hammer against the replacement pin 12' at end section 12B is transferred to the insulator 30 via the previously obtained abutting relationship of the enlarged diameter section 12D of the replacement pin 12' against the shoulder 34 of the insulator 30 being carried by the leading end section 12C. Simultaneously, the insulator 30 cushions the adverse impact of the blows on the backplane 15 while assisting in maintaining the replacement pin 12' in correct alignment and orientation.

As best seen in FIG. 8B, the selected pin mounting hole 22 is sufficiently enlarged to enable the shoulder 34 of the annular insulator to be snugly received within the selected pin mounting hole. Advantageously, the pin mounting hole 22 thereby also provides alignment and guidance to the insulator 30 while the body of the insulator 30 is being pushed through the enlarged backplane receptor hole 13 before the insulator 30 has been fully inserted into the backplane pin receptor hole 13.

Thus, an important aspect of the invention is that the annular insulator 30 is mounted and carried by the replacement pin 12' before being pushed into the associated pin receptor 14. The compliant contact section 12D is protectively surrounded by the annular insulator 30 during insertion of both the compliant section 12D and insulator 30 into the associated backplane interlayered pin receptor connector 14.

Figure 9A:
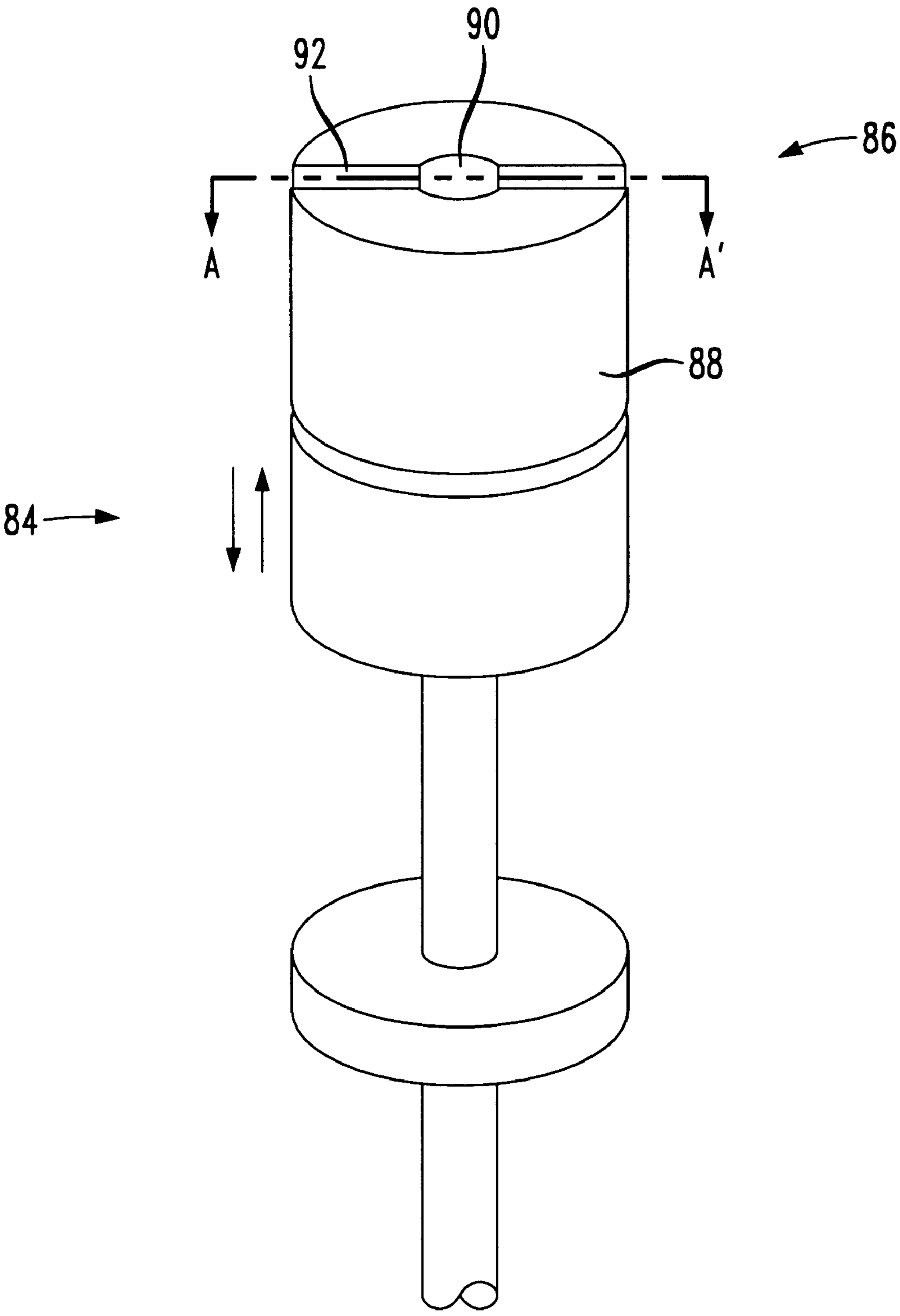
FIG. 9A is a perspective view of the pin insertion tip tool of the invention.
Figure 9B:
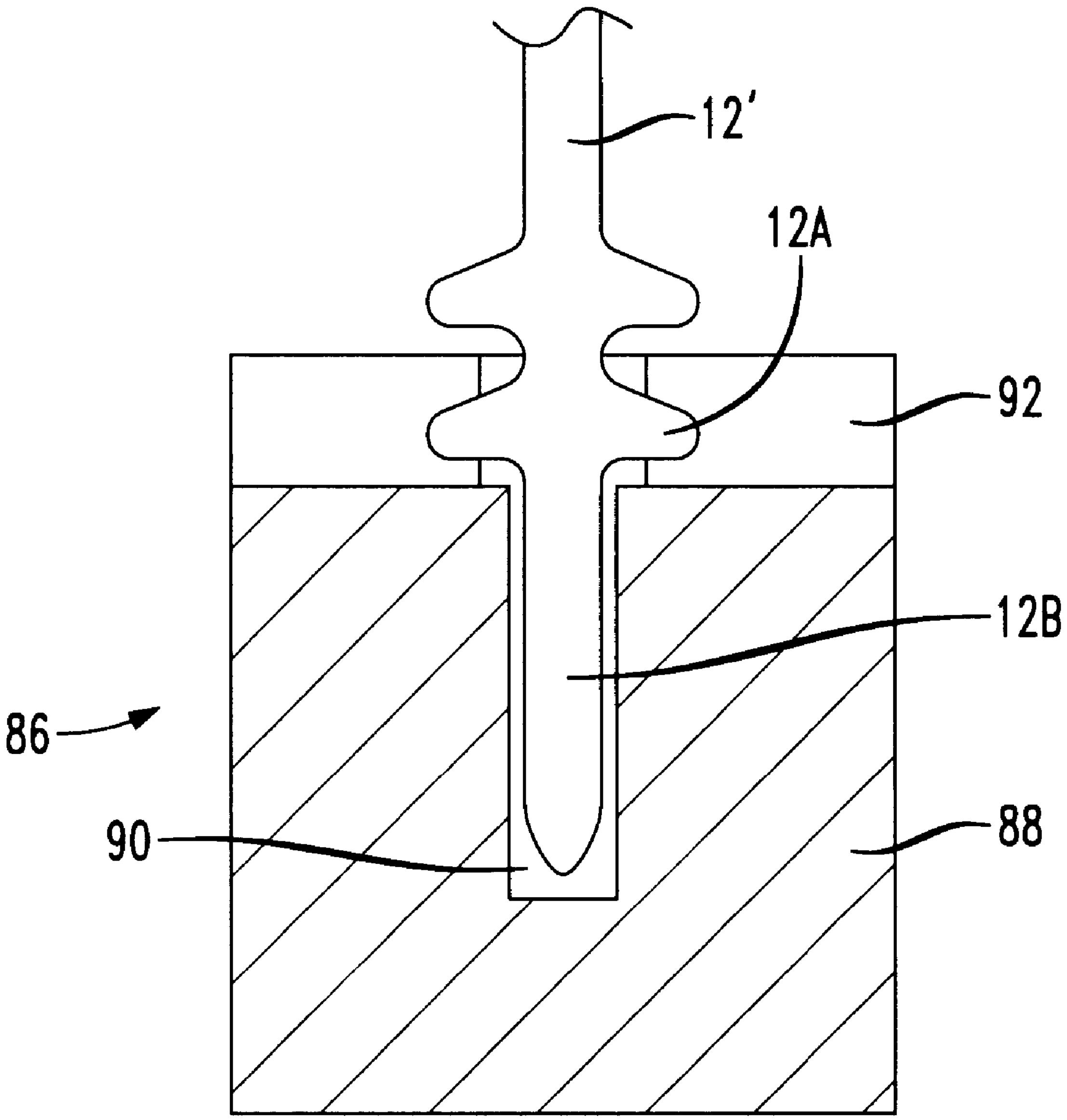
FIG. 9B is a cross sectional view along A-A' of the pin insertion tip tool shown in FIG. 9A.

The pounding of the replacement pin as described herein is preferably performed with a slide hammer 84 shown in FIGS. 9A and 9B. The slide hammer 84 has a pin insertion tip tool 86. The insertion tip tool 86 has a cylindrical body 88, a bore 90 for receiving the aft pin section 12B of the replacement pin 12' and a slot 92 for receiving the enlarged diameter section 12A of the replacement pin 12'.

While a preferred embodiment of the present invention has been disclosed in detail, it should be appreciated that variations may be made with respect to these details without departing from the scope of the invention as defined in the following claims. For instance, while it is preferred that the enlarged diameter opening 66 has inwardly tapered walls which gradually merge with the pin receiving opening 56 to enhance self-alignment, as discussed above, a cylindrically shaped, relatively enlarged diameter opening for snugly receiving and supporting the cylindrical outer wall of the insulator adjacent the end 36 is also contemplated. Likewise, while use of the header contact repairing fixture 40 as described above is preferred in premounting the insulator 30 to the replacement pin 12' prior to insertion into the enlarged pin receptor hole 13 such use is not required with respect to the aspect of the inventive method relating to insertion after the premounting has been accomplished.

What is claimed is:

1. A method for repairing a contact pin header connector having a contact wall with a plurality of pin mounting holes for carrying a plurality of contact pins extending through the wall and connected at a compliant contact section with an associated plurality of interlayered pin receptor connectors of a backplane to which the header connector is mounted, comprising the steps of:

removing a contact pin from a selected one of the plurality of pin mounting holes in the contact wall of the header connector;

fabricating a replacement pin by reducing the diameter of the compliant contact section by passing the complaint contact section through a sizing hole in a pin sizing fixture in which the sizing holes has an inner section with a diameter less than that of the compliant contact portion of the replacement pin, and an outer, relatively enlarged section extending between and joining a relatively enlarged pin receiving opening having a diameter larger than the outer diameter of an annular insulator and the relatively reduced inner section;

positioning the annular insulator around the replacement pin with the compliant contact section at a preselected location between opposed ends of the replacement pin which includes the steps of supporting an end of the insulator in the outer, relatively enlarged section in an upright orientation with its central axis substantially aligned with the elongate central axis of the inner section of the sizing hole, and pushing the replacement pin through the annular insulator and into the inner section of the sizing hole while the insulator is being supported in the outer, relatively enlarged section;

enlarging the selected pin mounting hole sufficiently to enable the replacement pin and the annular insulator carried by the replacement pin to pass through the selected pin mounting hole; and after enlarging the selected pin mounting hole, inserting a leading edge portion of the replacement pin through the selected pin mounting hole and the associated backplane interlayed pin receptor connector until the annular insulator is received within the associated backplane interlayed pin receptor connector.

2. The method of claim 1 in which the step of fabricating the replacement pin includes the step of passing the replacement pin through another sizing hole having a diameter larger than the diameter of the one sizing hole but smaller than the diameter of the compliant contact section to sufficiently reduce the diameter of the compliant contact section to enable receipt and passage through the one sizing hole to further reduce the diameter of the compliant contact section.

3. The method of claim 1 in which the step of positioning includes the steps of first manually passing a leading end of the replacement pin through the annular insulator and then holding an end of the replacement pin opposite the leading end to maneuver the replacement pin and the insulator into position with the insulator being supported by the relatively enlarged outer section of the one sizing hole.

4. The method of claim 3 in which the outer, relatively enlarged section of the one sizing hole has a generally funnel-like shape with a wall inwardly slanted in a direction extending from the relatively enlarged opening to the relatively reduced diameter inner section, and in which the step of positioning includes the step of using the inwardly slanted wall to guide the leading edge of the replacement pin into the reduced diameter section and the annular insulator into supportive relationship with the slanted wall of the generally funnel-shaped outer section.

5. The method of claim 4 in which the step of positioning includes the step of supporting the end of the insulator on a portion of the slanted wall located intermediate the relatively enlarged diameter open end of the funnel-shaped section and the inner section.

6. The method of claim 1 in which the step of positioning includes the step of positioning the annular insulator at a location spaced forwardly of the compliant section, and the step of pushing includes the step of using a slide hammer to pound the replacement pin and the annular insulator within the associated backplane pin receptor connector.

7. The method of claim 1 in which the insulator has a generally cylindrical body and an annular collar adjacent an open end and extending radially outwardly from the body, and including the step of passing the collar through the pin mounting hole and into blocking abutment with the backplane pin receptor connector.

8. The method of claim 7 including the step of enlarging the associated backplane pin receptor connector to a diameter that is less than an outer diameter of the annular collar and greater than an outer diameter of the cylindrical body.

9. The method of claim 1 in which the replacement pin is a pin other than the pin which has been removed from the preselected pin mounting hole in the header connector.

10. The method of claim 9 in which the replacement contact pin has a length greater than that of the defective contact pin which is removed from the header connector to extend from the backplane to facilitate hard wire connection to the replacement pin.

11. A method for repairing a contact pin header connector having a contact wall with a plurality of pin mounting holes for carrying a plurality of contact pins extending through the wall and connected with an associated plurality of interlayered pin receptor connectors of a backplane to which the header connector is mounted, comprising the steps of:

removing a contact pin from a selected one of the plurality of pin mounting holes in the contact wall of the header connector;

fabricating a replacement pin by reducing the diameter of a compliant contact portion of the replacement pin to enable receipt of both the compliant contact portion and an annular insulator surrounding the compliant contact portion within the associated backplane interlayered pin receptor connector by passing the compliant contact portion through a sizing hole in a pin sizing fixture having an inner section with a diameter less than the that of the compliant contact portion of the replacement pin, and an outer, relatively enlarged section extending between and joining a relatively enlarged pin receiving opening having a diameter larger than an outer diameter of the annular insulator and the diameter of the relatively reduced inner section;

positioning the annular insulator around the replacement pin at a preselected location between the opposed ends of the replacement pin by the steps of supporting an end of the insulator in the outer, relatively enlarged section in an upright orientation with its central axis of the inner section of the sizing hole, and pushing the replacement pin through the annular insulator and into the inner section of the sizing hole while the insulator is being supported in the outer relatively enlarged section; and inserting the replacement pin through the preselected pin mounting hole and through the associated backplane pin receptor connector with the compliant section protectively surrounded by the annular insulator located in the associated backplane pin receptor connector.

12. The method of claim 11 in which the step of fabricating the replacement pin includes the step of passing the replacement pin through another sizing hole having a diameter larger than the diameter of the one sizing hole but smaller than the diameter of the compliant contact section to sufficiently reduce the diameter the compliant contact section to enable receipt and passage through the one sizing hole to further reduce the diameter of the compliant contact section.

13. The method of claim 11 in which the step of positioning includes the steps of first manually passing a leading end of the replacement pin through the annular insulator, and then holding an end of the replacement pin opposite the leading end to maneuver the replacement pin and the insulator into position with the insulator being supported by the outer relatively enlarged section includes the step of supporting the end of the insulator on a portion of the slanted wall located intermediate the relatively enlarged diameter open end of the funnel-shaped section and the inner section.

14. The method of claim 11 in which the step of positioning includes the step of positioning the annular insulator at a location spaced forwardly of the compliant section, and the step of pushing includes the step of using a slide hammer to pound the replacement pin through the pin mounting hole and the annular insulator until the compliant contact section is surrounded by the annular insulator.

* * * * *